Sept. 5, 1950 R. D. WILEY 2,521,107
FILTERING DEVICE
Filed Jan. 12, 1949
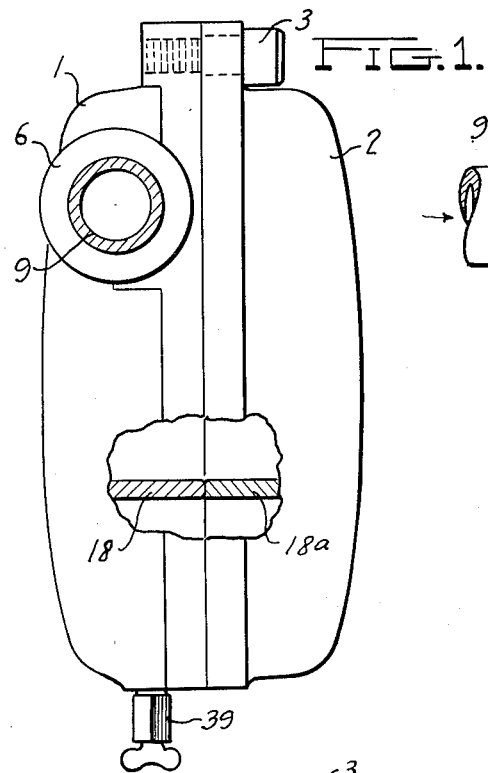
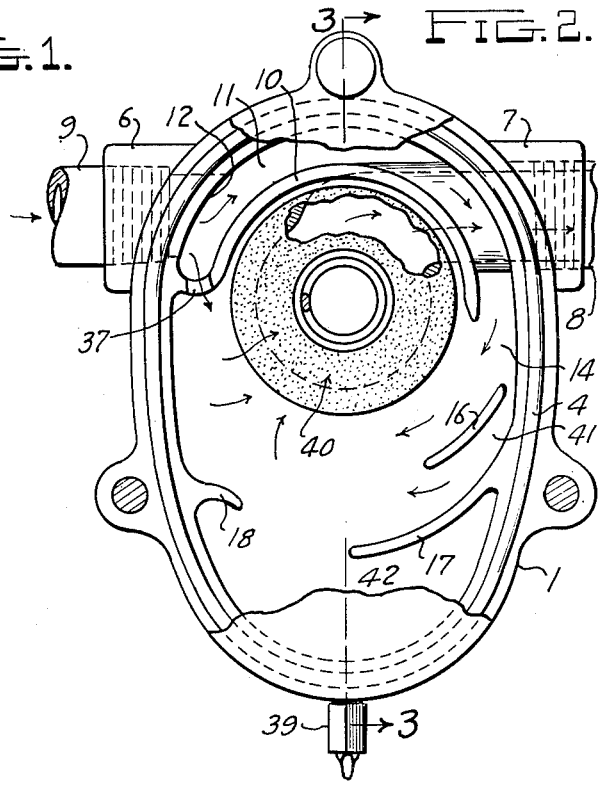
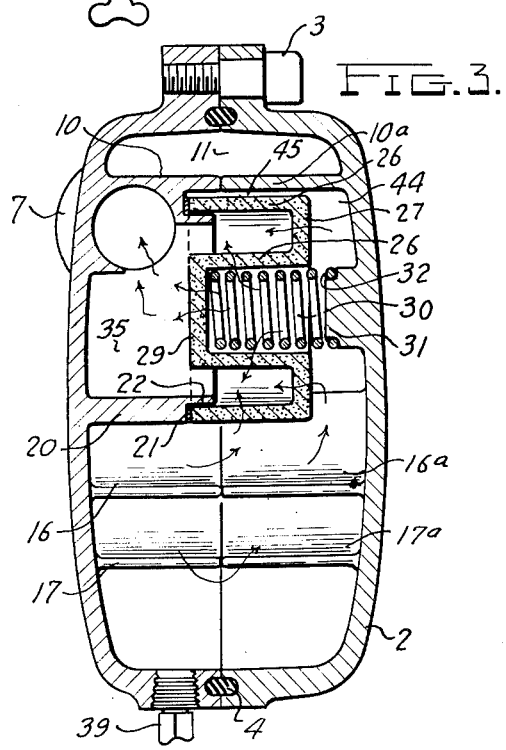
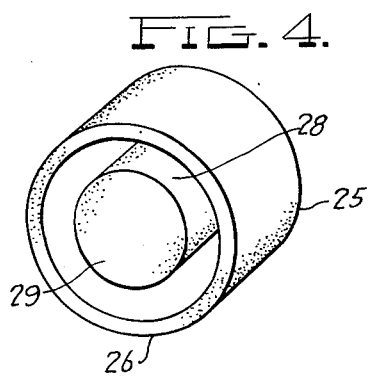
INVENTOR.
Robert D. Wiley
BY
Barnes, Kisselle, Laughlin & Raisch
ATTORNEYS Patented Sept. 5, 1950

2,521,107

UNITED STATES PATENT OFFICE 2,521,107

FILTERING DEVICE

Robert D. Wiley, Birmingham, Mich.

Application January 12, 1949, Serial No. 70,537

4 Claims. (Cl. 183—44)

This invention relates to a filter for fluids, either liquid or gas, and has to do particularly with a filter construction presenting a small compact form and yet providing a filtering element presenting a relatively large surface area for the flow of filtrate therethrough with little resistance.

The general objects of the invention are to provide a filter construction which can be mounted on or adjacent a machine with which the filter is to be used and so that the outer housing may be conveniently opened for cleansing without breaking the flow line or conduit system. To this end, the enclosing housing of the filter is formed in two portions positioned side by side, so to speak, and the opening of the housing is accomplished by opening one side, still, without breaking the conduit system. Another object is to provide a filter which combines a centrifugal separating action as well as the action of passing the filtrate through a filtering body.

A filter constructed in accordance with the invention is shown in the accompanying drawings wherein:

Fig. 1 is an elevational view with some parts broken away looking at one side of the structure and showing the inlet for the medium to be filtered.

Fig. 2 is a view with one part of the housing cut away and with parts in section looking into the filter.

Fig. 3 is a sectional view taken on line 3—3 of Fig. 2 showing the filtering element and the outlet passage.

Fig. 4 is a perspective view of the filtering element.

The filter has a housing comprised of two separable parts. The main body part is shown at 1 while the removable part which may be called the cap, is shown at 2. The two parts are flanged as indicated and may be secured together by cap screws 3 with an intervening sealing member 4 positioned in aligned grooves in the parts. With a sealing washer of this construction the abutting faces of the parts need not be machined with particular close accuracy as the washer 4 is engaged and compressed and thus provides the sealing action.

The portion 1 has an extension 6 for receiving an inlet pipe 9 and an extension 7 for receiving an outlet pipe 8. The body portion 1 has a partition 10 of arcuate form which, together with the top wall of the housing, provides an inlet passage 11 which communicates with the inlet 12 leading from the extension 6. The passage 11 opens into the lower portion of the housing at the location 14. Below the junction 14 the main body part has a baffle 16 and another baffle 17 and preferably a small baffle 18.

The body part also has a circumferential wall 20, a portion of which is integrally formed with the wall 10 and this wall is provided with a circular seat for the filtering element, the wall 20 preferably having an extension 22 for fitting into the element as will presently be seen.

The filtering element generally indicated at 25, is somewhat in the shape of a cup having an outer wall 26, an end wall portion 27, a central depressed portion having a wall 28 with the depressed portion having an end wall 29. This filtering element is arranged to be positioned with the end of its outer wall 26 seated on the shoulder 21 preferably with an intervening gasket, as shown. And it is held in position by a coil spring 30. This spring extends into the portion 28 and engages the end wall 29. The opposite end of the spring is mounted on a seat 31 of the removable housing member 2 and the seat is preferably peened over the lower convolution of the spring, as shown at 32, to hold the spring permanently assembled on the seat. This filtering element is a porous solid such as a sintered metal of which sintered bronze is an example.

The removable section 2 is provided with an internal wall and with baffles for matching the wall 10 and the baffles 16, 17 and 18 of the casing member 1. As shown in Fig. 3, the section 2 has a wall portion 10a which abuts the wall portion 10, and thus closes the passage 11 and it has baffles 16a and 17a for cooperation with the baffles 16 and 17, and as shown in Fig. 1, has a baffle 18a cooperating with baffles 18. Within the circumferential wall 20, the main body member has an outlet chamber 35 which communicates with the outlet passage 36 in the extension 7. The wall 10 has what may be termed a bleed port 37 positioned as shown in Fig. 2, for the passage therethrough of some of the fluid to be filtered. This bleed port may be provided by merely a slot in the wall 10 whereas the wall 10a may have no matching slot. A drain valve 39 is in the bottom portion of the housing part 1 and this may be opened for draining water or other liquid which may collect in the housing.

In the operation of the filter, the incoming fluid enters the passage 11 and flows through this curved passage. The curved flow path given to the substance sets up a centrifugal action which throws some of the heavier particles to the outside. As the substance leaves the passage, some of it enters the chamber 40 while heavier particles or solid pieces may pass behind under the baffle 16 in passage 41. These heavier particles may then flow along the baffle 17 and 17a and may deposit in the lower portion 42 of the housing. The baffles 18 and 18a help to break up the flow and to maintain a quiescent status in the portion 42. Also as the filtrate enters the shell, some flows through the port 37. This substance is accordingly flowing in a direction opposite that entering the chamber 40 and so the centrifugal flow is broken up.

As will be seen by reference to Fig. 3, the filtering element is spaced from the cap 2 so that the filtrate in the chamber 40 can flow into the chamber area 44. The wall 26 is also spaced from the partitions 10 and 10a thus providing a flow area 45. The filtrate, after passing into the chamber 40, then has access to the entire circumferential extent of the wall 26 of the filtering element and to the bottom wall 27 thereof and may also flow into the recess in the filtering element and through the walls 28 and 29 thereof. The filtrate which flows through the filtering element then, as will be seen, flows into the outlet chamber 35 and thence to the conduit 8.

It will be seen that the compact filter body is provided which can be easily mounted on or adjacent the side or some other part of a machine which may, for example, use compressed air in one way or another or hydraulic medium for operating the same. Also, the filtering element, while small, provides a large surface area for the flow of substance therethrough. For example, a filtering element of about 1¾" in diameter and about 1" in axial depth presents about 9 square inches of surface. The large surface results in a minimum of back pressure or resistance to the flow of a filtrate therethrough and also reduces the velocity. The direction of flow through the filter tends to seat and hold the filtering element on its seat. Also, it will be observed that no direct blast of the filtrate strikes the filtering element. The incoming fluid passes through the passage 11 but is dispersed more or less in the passage 45 and areas 44 and 45 before striking the filtering element.

The portion 2 of the housing portion may be removed without disturbing the housing portion 1 which is connected into the conduit system. The removal of the portion 2 may be made for cleansing or other purposes. If water is trapped in the lower portion of the shell, it may be removed by opening the drain valve 39. This filter may be employed for filtering liquids and gases, such as an oil or other hydraulic medium, water, fuel oil, gasoline, and air, oxygen and other gases.

I claim:

1. A filter comprising, a housing of relatively elongated form adapted to be positioned with its long dimension vertically, inlet means and outlet means adjacent the upper end of the housing, a circumferential seat in the housing, the outlet means connecting to one side of the seat and the interior of the housing being in communication with the opposite side of the seat, a cup shaped filtering member positioned on said seat and dividing the inlet means of the housing from the outlet means, wall means in the housing forming a passage connecting with the inlet means, said passage being of curved form and extending partly around said seat and filtering member and opening into the housing, said seat and filtering member being in the upper part of the housing and said passage extending thereabove and having a discharge end opening downwardly in the housing and baffle means in the lower portion of the housing, for maintaining a quiescent zone in the lower portion of the housing whereby separated particles may collect therein, and a port in said wall means for the passage of entering fluid in a direction opposite to that of the fluid flowing through said passage for breaking the whirling action of the fluid in the housing.

2. A filter comprising, an elongated housing adapted to be positioned with its long dimension substantially vertically, said housing having a body part and a closure cap part with substantially vertically disposed meeting faces, the body part having inlet means and outlet means for fluid at its upper end, said body part having a seat therein with the outlet means connecting to one side of the seat, a cup shaped filtering element on said seat, the body member having a wall partially surrounding the seat and filtering element forming a curved passage in communication with the inlet means for setting up a whirling action of the incoming fluid, whereby some of the material is separated centrifugally, the body having a chamber positioned below the seat and filtering element and having baffles for the maintenance of a quiescent zone in the lower portion of the housing, said cap member having a cooperating wall and cooperating baffles adapted to substantially seat upon those of the body member.

3. A filter comprising, an elongated housing adapted to be positioned with its long dimension substantially vertically, said housing having a body part and a closure cap part with substantially vertically disposed meeting faces, the body part having inlet means and outlet means for fluid at its upper end, said body part having a seat therein with the outlet means connecting to one side of the seat, a cup shaped filtering element on said seat, the body member having a wall partially surrounding the seat and filtering element forming a curved passage in communication with the inlet means for setting up a whirling action of the incoming fluid, whereby some of the material is separated centrifugally, the body having a chamber positioned below the seat and filtering element and having baffles for the maintenance of a quiescent zone in the lower portion of the housing, said cap member having a cooperating wall and cooperating baffles adapted to substantially seat upon those of the body member and a port in the wall forming the curved passage for the flow therethrough of some of the incoming fluid in a direction substantially opposite the direction of flow of fluid through said curved passage.

4. A filter comprising, an elongated housing adapted to be positioned with its long dimension substantially vertically, said housing having a body part and a closure cap part with substantially vertically disposed meeting faces, the body part having inlet means and outlet means for fluid at its upper end, said body part having a seat therein with the outlet means connecting to one side of the seat, a cup shaped filtering element on said seat, the body member having a wall partially surrounding the seat and filtering element forming a curved passage in communication with the inlet means for setting up a whirling action of the incoming fluid, whereby some of the material is separated centrifugally, the body having a chamber positioned below the seat and filtering element and having baffles for the maintenance of a quiescent zone in the lower portion of the housing, said cap member having a cooperating wall and cooperating baffles adapted to substantially seat upon those of the body member, said filtering element having a recessed bottom, and spring means having one end seated on the cap and the other end extending into the said recess and acting upon the said element to hold the same on its seat.

ROBERT D. WILEY.

REFERENCES CITED

The following references are of record in the file of this patent:

UNITED STATES PATENTS

| Number | Name | Date |
|---|---|---|
| 386,173 | White | July 17, 1888 |
| 581,912 | Hunt | May 4, 1897 |
| 1,805,824 | Hendrickson | May 19, 1931 |
| 2,068,048 | Adams | Jan. 19, 1937 |
| 2,442,696 | Krieck | June 1, 1948 |